United States Patent
Kwon et al.

(10) Patent No.: US 8,798,649 B2
(45) Date of Patent: Aug. 5, 2014

(54) APPARATUS AND METHOD FOR TRANSMITTING HANDWRITING ANIMATION MESSAGE

(75) Inventors: Mu-Sik Kwon, Seoul (KR); Sang-Wook Oh, Ansan-si (KR); Seong-Taek Hwang, Pyeongtaek-si (KR); Jung-Rim Kim, Suwon-si (KR); Do-Hyeon Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 98 days.

(21) Appl. No.: 13/012,435

(22) Filed: Jan. 24, 2011

(65) Prior Publication Data

US 2011/0183691 A1 Jul. 28, 2011

(30) Foreign Application Priority Data

Jan. 22, 2010 (KR) .......................... 10-2010-0006110

(51) Int. Cl.
*H04W 4/00* (2009.01)

(52) U.S. Cl.
USPC .......................... 455/466; 455/414.4; 455/566

(58) Field of Classification Search
USPC ................. 455/566, 550.1, 466, 412.1–414.4, 455/556.1, 556.2, 575.1, 90.1; 382/181, 382/187, 311, 312, 313, 314, 315; 345/156, 345/169, 173, 179; 379/67.1, 88.12
See application file for complete search history.

(56) References Cited

U.S. PATENT DOCUMENTS

| | | | | |
|---|---|---|---|---|
| 5,856,825 | A * | 1/1999 | Yumoto et al. | 715/201 |
| 6,907,275 | B2 * | 6/2005 | Wang | 455/566 |
| 7,894,833 | B2 | 2/2011 | Sohn et al. | |
| 8,107,980 | B2 * | 1/2012 | Jeong | 455/466 |
| 8,140,126 | B2 * | 3/2012 | Choi | 455/566 |
| 8,565,741 | B2 * | 10/2013 | Yang | 455/414.4 |
| 8,666,374 | B2 * | 3/2014 | Blades | 455/414.1 |
| 2002/0159600 | A1 * | 10/2002 | Weiner | 380/270 |
| 2003/0227894 | A1 * | 12/2003 | Wang et al. | 370/338 |
| 2005/0143136 | A1 * | 6/2005 | Lev et al. | 455/566 |
| 2006/0148527 | A1 * | 7/2006 | Blount | 455/566 |
| 2007/0004461 | A1 * | 1/2007 | Bathina et al. | 455/566 |
| 2007/0171938 | A1 * | 7/2007 | Sohn et al. | 370/466 |
| 2008/0119235 | A1 * | 5/2008 | Nielsen et al. | 455/566 |
| 2008/0280633 | A1 * | 11/2008 | Agiv | 455/466 |
| 2009/0073494 | A1 * | 3/2009 | Takemoto | 358/1.18 |
| 2010/0001959 | A1 * | 1/2010 | Kim | 345/169 |
| 2010/0067674 | A1 | 3/2010 | Lee | |
| 2011/0086650 | A1 * | 4/2011 | Kwon et al. | 455/466 |

FOREIGN PATENT DOCUMENTS

| | | |
|---|---|---|
| EP | 2 133 841 | 12/2009 |
| GB | 2 308 523 | 6/1997 |
| KR | 1020050046879 | 5/2005 |
| KR | 100800458 | 2/2008 |
| KR | 1020080039606 | 5/2008 |
| KR | 100859880 | 9/2008 |
| WO | WO 2004/056083 | 7/2004 |

* cited by examiner

*Primary Examiner* — Sharad Rampuria
(74) *Attorney, Agent, or Firm* — The Farrell Law Firm, P.C.

(57) ABSTRACT

Provided is a system for transmitting a handwriting animation message including a transmitting mobile terminal for transmitting the handwriting animation message including coordinate information and time information of one or more points forming handwriting information which is input by a user of a transmitting mobile terminal, an animation messaging server for, upon receiving the handwriting animation message, transcoding the handwriting animation message into a format supported by the receiving mobile terminal and transmitting the transcoded handwriting animation message, and the receiving mobile terminal for receiving the transcoded handwriting animation message.

14 Claims, 8 Drawing Sheets

APPARATUS AND METHOD FOR TRANSMITTING HANDWRITING ANIMATION MESSAGE

PRIORITY

This application claims priority under 35 U.S.C. §119(a) to a Korean Patent Application filed in the Korean Intellectual Property Office on Jan. 22, 2010 and assigned Serial No. 10-2010-0006110, the entire disclosure of which is incorporated herein by reference.

BACKGROUND OF THE INVENTION

1. Field of the Invention

The present invention generally relates to text message transmission, and more particularly, to an apparatus and method for transmitting a handwriting animation message.

2. Description of the Related Art

With the development of various technologies such as wired and wireless communication techniques, multimedia techniques, manufacturing techniques for hardware like a Central Processing Unit (CPU) and a memory, power charging techniques, and so forth, functions of mobile terminals have been emphasized more and more. For example, a mobile terminal conventionally transmits necessary data to through voice communication. However, after transmission and reception of a text message became possible, desired data can be transmitted by using Short Message Service (SMS) including simple text data in cases where voice communication is not allowed or simple data needs to be transmitted.

SMS has evolved into Long Message Service (LMS) for long text data and Multimedia Message Service (MMS) for multimedia files such as still or moving images, through which users can be provided with various benefits. Particularly, the MMS, which can transmit a multimedia file, unlike SMS or LMS which can only transmit text data, has been in increasing demand from users due to its improved ability to allow users to express themselves. The following describes a method for transmitting desired data by using the MMS.

FIG. 1 illustrates a mobile terminal, which performs information transmission using a conventional MMS.

Referring to FIG. 1, a user may create an MMS message by inputting desired characters or attaching a desired image. An MMS input scheme illustrated in FIG. 1 is configured such that the user inputs a character using a keypad 105, but in a mobile terminal supporting a touch screen, the user may input the character directly onto the screen by using a finger or an input means such as a stylus pen. By using a file attachment box 103 provided below a character input window 101, the user may retrieve an image stored in a memory and may attach the retrieved image.

In transmission of handwriting animation data generated by a user of a particular mobile terminal over a mobile communication network, if the mobile communication network permits transmission of a file such as animation expression format information or a flash file and a receiving mobile terminal is capable of reproducing such a file, the receiving mobile terminal normally receives handwriting animation information. However, a conventional legacy mobile terminal, which does not support an animation reproduction method has a limitation in normally receiving animation data. Accordingly, there is a need for a technique for transcoding, i.e., converting one encoding to another, the animation data to be compatible with the low-level specifications of the legacy mobile terminal for transmission.

SUMMARY OF THE INVENTION

Accordingly, an aspect of the present invention is to provide an apparatus and method, by which to transmit handwriting animation information of a transmitting mobile terminal, transmission-requested handwriting animation information is transcoded to be compatible with the low-level specifications of a mobile terminal in a mobile communication system, thereby allowing a mobile terminal, which does not support a particular format, to normally reproduce handwriting animation.

According to an aspect of the present invention, there is provided a method for transmitting a handwriting animation message. The method includes receiving the handwriting animation message including coordinate information and time information of one or more points forming handwriting information which is input by a user of a transmitting mobile terminal, checking file format information supported by a receiving mobile terminal, transcoding the handwriting animation message into a format supported by the receiving mobile terminal, and transmitting the transcoded handwriting animation message to the receiving mobile terminal.

According to another aspect of the present invention, there is provided an apparatus for transmitting a handwriting animation message. The apparatus includes an animation transcoder for, upon receiving the handwriting animation message including coordinate information and time information of one or more points forming handwriting information which is input by a user of a transmitting mobile terminal, transcoding the handwriting animation message into a format supported by the receiving mobile terminal, a mobile terminal profile database for storing one or more pieces of information of the receiving mobile terminal and transmitting them upon being requested, and a controller for, upon receiving the handwriting animation message from the transmitting mobile terminal, controlling the mobile terminal profile database to extract the one or more pieces of information of the receiving mobile terminal and transmit one or more pieces of information of the transmitting mobile terminal to the animation transcoder.

BRIEF DESCRIPTION OF THE DRAWINGS

The above and other features and advantages of an embodiment of the present invention will be more apparent from the following detailed description taken in conjunction with the accompanying drawings, in which.

DETAILED DESCRIPTION OF EMBODIMENTS OF THE PRESENT INVENTION

Hereinafter, an embodiment of the present invention will be described in detail with reference to the accompanying drawings. In the following description, details such as components are provided, but they are provided to assist a comprehensive understanding of the present invention. Accordingly, those of ordinary skill in the art will recognize that various changes and modifications of the details can be made without departing from the scope of the invention.

Prior to describing of the present invention, a handwriting animation message will be defined.

A user of a transmitting mobile terminal touches the terminal by using a finger or an input means such as a stylus pen to input handwriting. The input handwriting information includes one or more points, each of which includes time information and coordinate information. When such point information is transmitted to a receiving mobile terminal, the receiving mobile terminal reproduces the handwriting information based on the transmitted information as if the user of the transmitting mobile terminal directly wrote it. Such a message is defined as the handwriting animation message.

Figure 1:
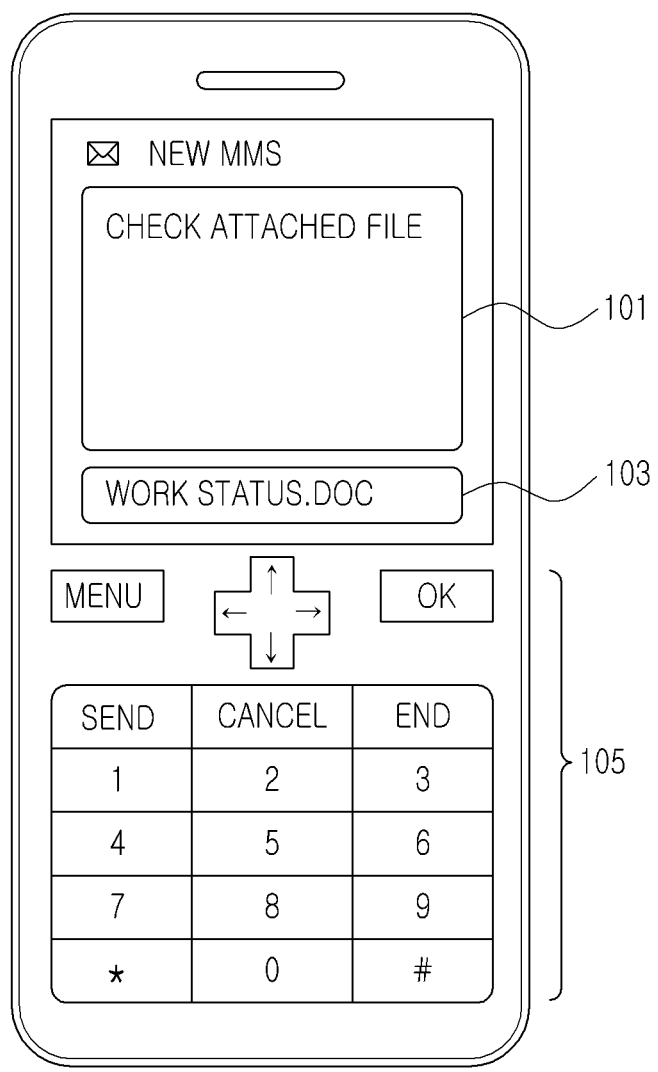
FIG. 1 illustrates a mobile terminal, which performs information transmission using a conventional MMS.
Figure 2:
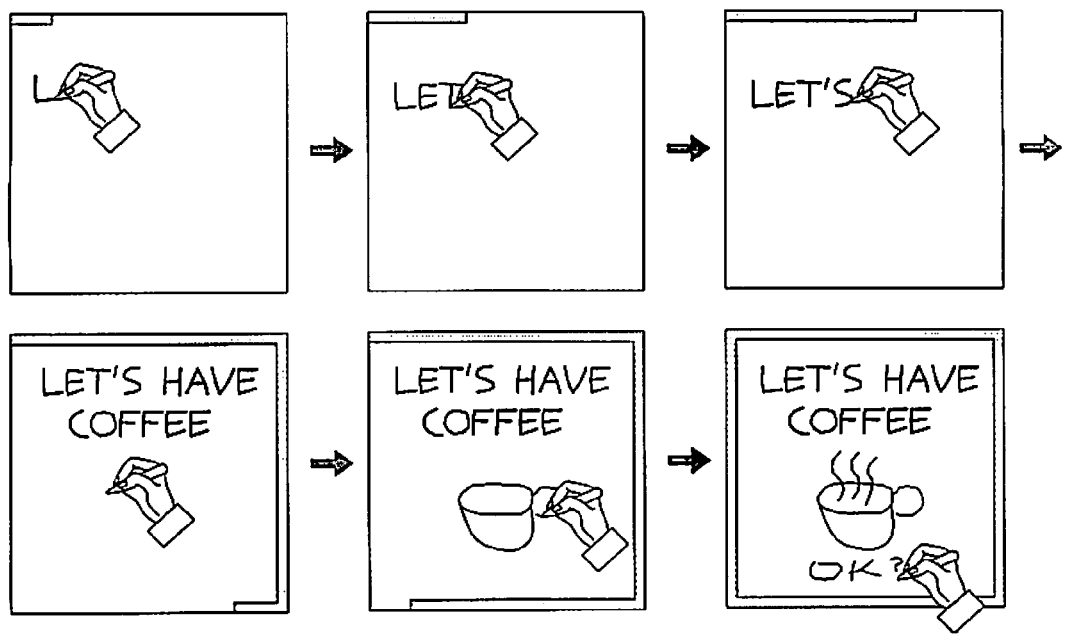
FIG. 2 illustrates a process of generating a handwriting animation message based on sequential time information according to an embodiment of the present invention.

FIG. 2 illustrates a process of generating a handwriting animation message based on sequential time information according to an embodiment of the present invention.

Referring to FIG. 2, each point includes unique coordinate information and time information, and each time a single point or a group of points is generated, encoding is performed to generate a progress bar, which is shown on an edge of the screen on a real-time basis. For example, when a message "Let's have coffee" is handwritten as illustrated in FIG. 2, different codes are generated according to coordinate information and time information of respective points, and the progress bar is sequentially displayed on an edge of the screen simultaneously with the display of the points on the screen.

If the writing animation message is not input any more or reaches a previously stored maximum allowable encoding amount, a code indicating an end of the handwriting animation message is generated and displayed on the screen, thus terminating the input of the handwriting animation message. In FIG. 2, codes are generated in an edge of the screen clockwise from the left top, but such a configuration is subject to change according to user's setting.

Figure 3:
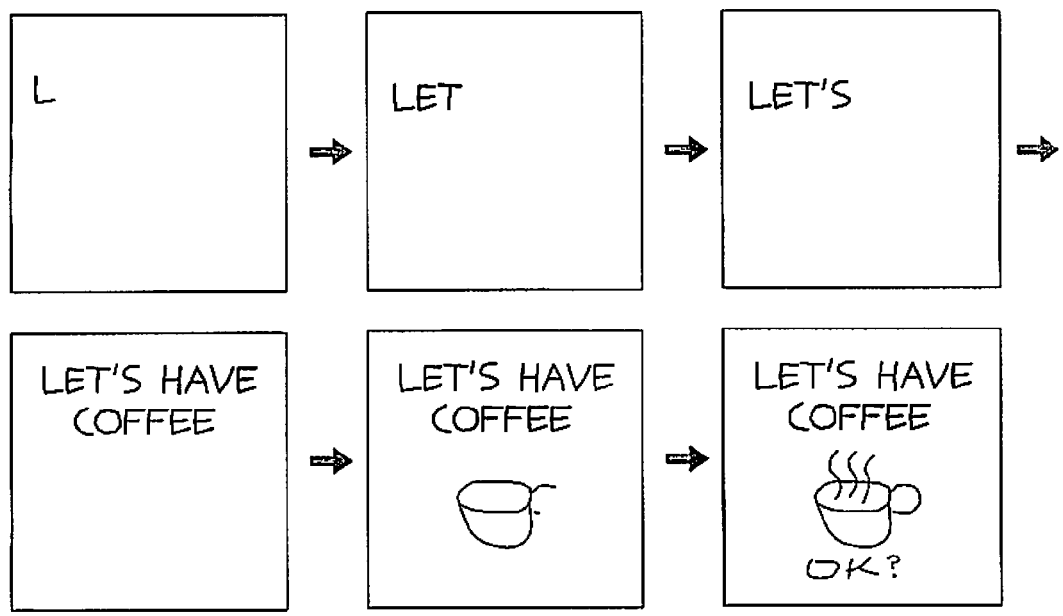
FIG. 3 illustrates a process of reproducing a handwriting animation message based on sequential time information according to an embodiment of the present invention.

FIG. 3 illustrates a process of reproducing a handwriting animation message based on sequential time information according to an embodiment of the present invention.

Referring to FIG. 3, decoding is performed clockwise from a code corresponding to a start of a handwriting animation message, and the handwriting animation message is reproduced on the screen in real-time. For example, if the handwriting animation message "Let's have coffee" is received, one or more codes encoded based on coordinate information and time information of the respective points are decoded and those points are sequentially reproduced on the screen by using the decoded information. The progress bar on an edge of the screen of the transmitting mobile terminal is not displayed on the screen of the receiving mobile terminal.

Figure 4:
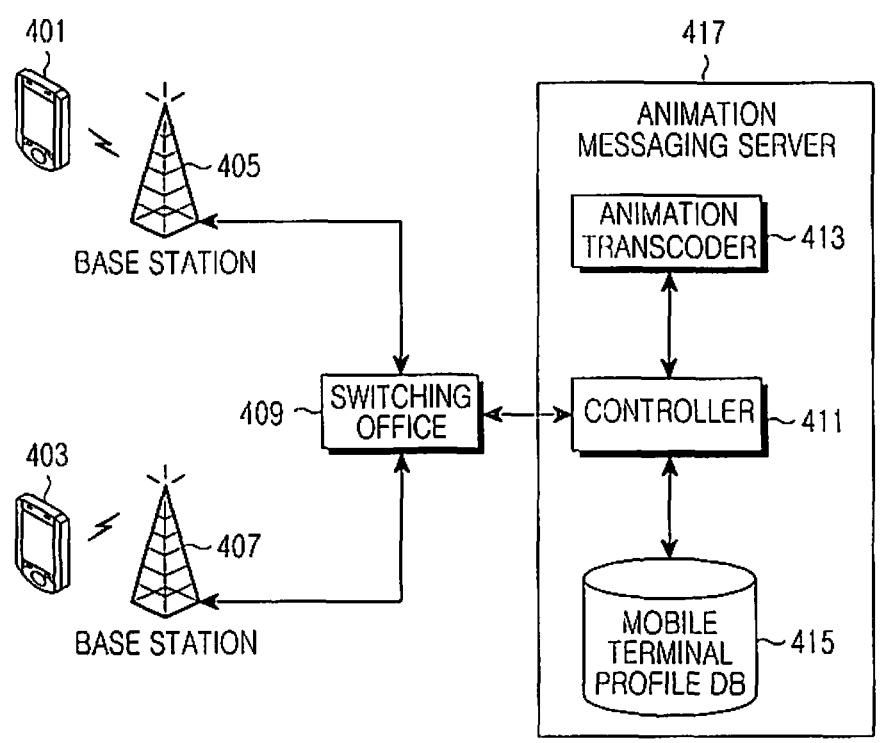
FIG. 4 illustrates a system for performing a handwriting animation message service according to an embodiment of the present invention.

FIG. 4 illustrates a system for performing a handwriting animation message service according to an embodiment of the present invention. The system illustrated in FIG. 4 includes a transmitting mobile terminal 401, a receiving mobile terminal 403, base stations 405 and 407, a switching office 409, and an animation message server 417 which includes a controller 411, an animation transcoder 413, and a mobile terminal profile database 415.

Referring to FIG. 4, the transmitting mobile terminal 401 generates a handwriting animation message and transmits it to the receiving mobile terminal 407, and the handwriting animation message transmitted from the transmitting mobile terminal 401 is transmitted to the controller 411 of the animation messaging server 417 through the base station 405 and the switching office 409.

The controller 411 of the animation messaging server 417, upon receiving the handwriting animation message, checks information of the receiving mobile terminal 403 included in the received handwriting animation message, and transmits the information to the mobile terminal profile database 415. The controller 411 also checks received profile information of the receiving mobile terminal 403 and if the receiving mobile terminal 403 supports reproduction of the handwriting animation message, the controller 411 transmits the handwriting animation message to the switching office 409 to allow the receiving mobile terminal 403 to receive the handwriting animation message. The handwriting animation message transmitted to the switching office 409 is transmitted to the receiving mobile terminal 403 through the base station 407.

If the receiving mobile terminal 403 does not support reproduction of the handwriting animation message, the controller 411 transmits the handwriting animation message together with information about a format which can be reproduced by the receiving mobile terminal 403 to the animation transcoder 413.

The animation transcoder 413 transcodes the handwriting animation message received from the controller 411 into a format, which can be reproduced by the receiving mobile terminal 403, and transmits the transcoded handwriting animation message to the controller 411.

The mobile terminal profile database 415 checks the information of the receiving mobile terminal 403 received from the controller 411 to check a profile of the receiving mobile terminal 403 stored in the mobile terminal profile database 415. This profile includes the information about formats, which can be reproduced by the receiving mobile terminal 403, and the mobile terminal profile database 415 transmits the profile of the receiving mobile terminal 403 to the controller 411.

A description will now be made of the detailed operations of the main components of the foregoing system.

Figure 5:
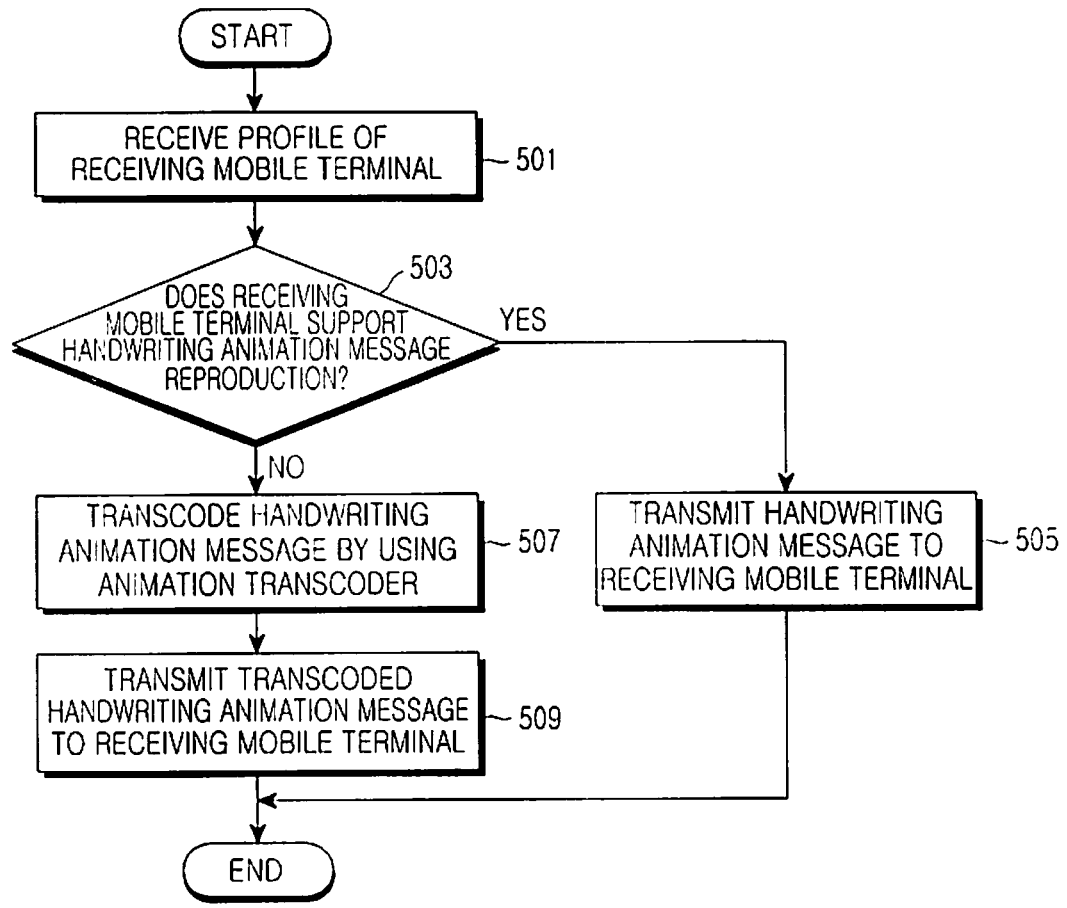
FIG. 5 is a flowchart illustrating operations of an animation messaging server according to an embodiment of the present invention.

FIG. 5 is a flowchart illustrating operations of the animation messaging server 417 according to an embodiment of the present invention.

Referring to FIG. 5, the controller 411 of the animation messaging server 417 receives the profile of the receiving mobile terminal 403 in step 501. The profile of the receiving mobile terminal 403 is received from the mobile terminal profile database 415. In step 503, the controller 411 determines from the received profile whether the receiving mobile terminal 403 supports reproduction of the handwriting animation message. If it is determined that the receiving mobile terminal 403 supports reproduction of the handwriting animation message, the controller 411 transmits the handwriting animation message to the receiving mobile terminal 403 without performing conversion, in step 505.

If it is determined that the receiving mobile terminal 403 does not support reproduction of the handwriting animation message, the animation transcoder 413 transcodes the handwriting animation message into a format suitable for the receiving mobile terminal 403 in step 507. In step 509, the animation transcoder 413 transmits the transcoded handwriting animation message to the receiving mobile terminal 403.

Figure 6:
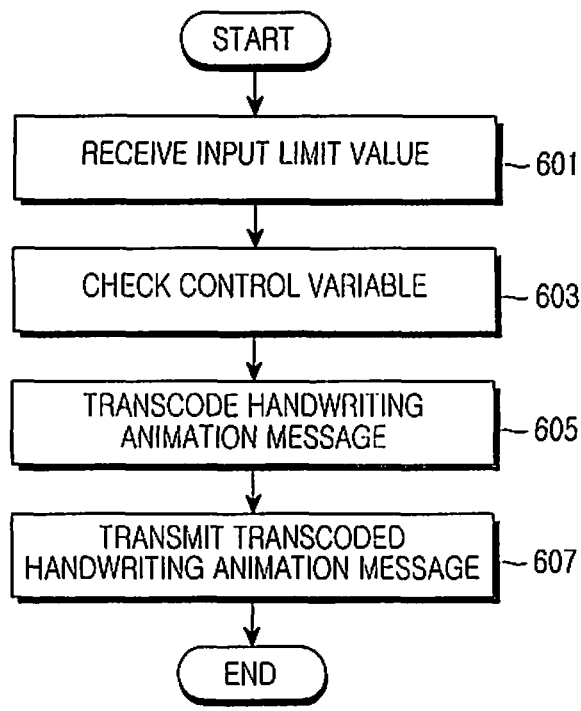
FIG. 6 is a flowchart illustrating operations of an animation transcoder according to an embodiment of the present invention.

FIG. 6 is a flowchart illustrating operations of the animation transcoder 413 according to an embodiment of the present invention.

Referring to FIG. 6, the animation transcoder 413 receives an input limit value from the mobile terminal profile database 415 to transcode the handwriting animation message into a format suitable for the receiving mobile terminal 403. The input limit value may include supportable formats, a resolution, a transmission limit amount, and transcoding priorities of the receiving mobile terminal 403, and, if necessary, may include other information. In step 603, the animation transcoder 413 may check and modify a control variable to facilitate reproduction of the handwriting animation message to be transcoded. The control variable may include a resolution of the receiving mobile terminal 403, the number of frames, the number of color pallets, the thickness of a stroke to be reproduced, and the speed of reproduction, and if necessary, may include other information.

In step 605, the animation transcoder 413 performs transcoding on the handwriting animation message by using the input limit value and the control variable, thus generating an optimal format. In step 607, the animation transcoder 413 transmits the handwriting animation message transcoded into an optimal format to the animation messaging server 411.

Figure 7:
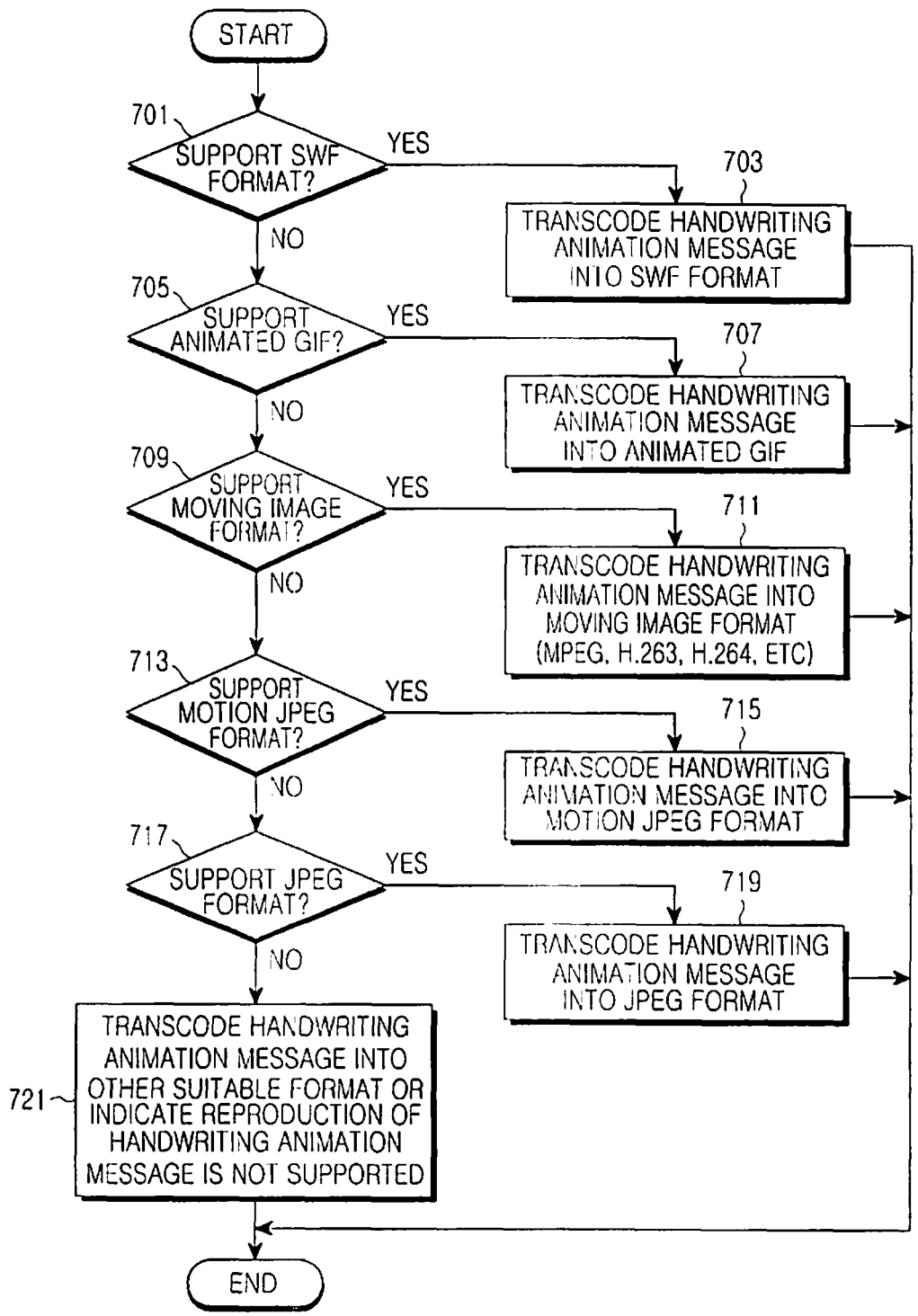
FIG. 7 is a flowchart illustrating a transcoding operation based on priorities between various support file formats according to an embodiment of the present invention.

FIG. 7 is a flowchart illustrating a transcoding operation based on priorities between various support file formats according to an embodiment of the present invention. The priorities have been determined according to some principles such as a possibility of expression as animation and an effective order for expression of a handwriting animation message, and the priorities may also be changed.

Referring to FIG. 7, the animation transcoder 413 determines whether the receiving mobile terminal 403 supports a Shock Wave Flash (SWF) format in step 701. If the receiving mobile terminal 403 supports the SWF format, the animation transcoder 413 transcodes a handwriting animation message into the SWF format in step 703. If the receiving mobile terminal 403 does not support the SWF format, the animation transcoder 413 determines whether the receiving mobile terminal 403 supports an animated Graphics Interchange Format (GIF) in step 705. If the receiving mobile terminal 403 supports the animated GIFs, the animation transcoder 413 transcodes the handwriting animation message into the animated GIF in step 707. If the receiving mobile terminal 403 does not support the animated GIF, the animation trans coder 413 determines whether the receiving mobile terminal 403 supports a moving image format (for example, a Moving Picture Experts Group (MPEG) format, a H.263 format, or a H.264 format) in step 709. If the receiving mobile terminal 403 supports the moving image format, the animation transcoder 413 transcodes the handwriting animation message into the moving image format in step 711. If the receiving mobile terminal 403 does not support the moving image format, the animation transcoder 413 goes to step 713.

In step 713, the animation transcoder 413 determines whether the receiving mobile terminal 403 supports a Motion Joint Photographic coding Experts Group (JPEG) format. If the receiving mobile terminal 403 supports the Motion JPEG format, the animation transcoder 413 transcodes the handwriting animation message into the Motion JPEG format in step 715. If the receiving mobile terminal 403 does not support the Motion JPEG format, the animation transcoder 413 goes to step 717. In step 717, the animation transcoder 413 determines whether the receiving mobile terminal 403 supports a JPEG format. If the receiving mobile terminal 403 supports the JPEG format, the animation transcoder 413 transcodes the handwriting animation message into the JPEG format in step 719. If the receiving mobile terminal 403 does not support the JPEG format, the animation transcoder 413 goes to step 721. In step 721, the animation transcoder 413 determines whether there is any other format that can be supported by the receiving mobile terminal 403, and transcodes the handwriting animation message into the corresponding format. If there is no other format that can be supported by the receiving mobile terminal 403, the animation transcoder 413 displays an error message indicating that reproduction of the handwriting animation message is not supported.

Formats that can be supported by the receiving mobile terminal 403 may be checked by using supportable formats of the receiving mobile terminal 403 included in an input limit value received from the mobile terminal profile database 415. Transcoded versions into the SWF format, the motion GIF, the moving image format, and the motion JPEG format can be reproduced as animation, such that a resolution, the number of frames, and the number of color palettes are adjusted to provide optimal quality within the limits of the conditions of the handwriting animation message transmission amount, thereby generating a format suitable for the receiving mobile terminal 403. If it is determined that the receiving mobile terminal 403 cannot reproduce animation, the handwriting animation message may be expressed as a still image such as a JPEG format or GIF, as will be described below.

Figure 8:
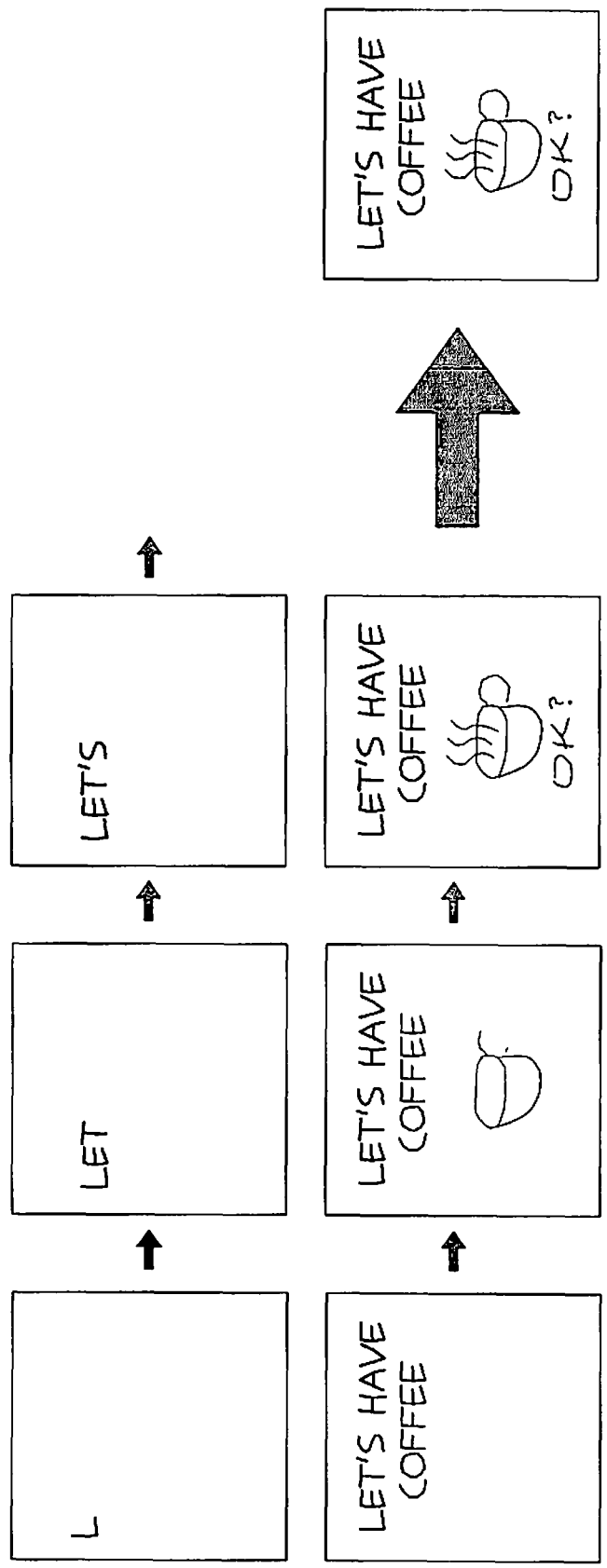
FIG. 8 illustrates a process of detecting a frame including a largest amount of handwriting information according to an embodiment of the present invention.

FIG. 8 illustrates a process of detecting a frame including a largest amount of handwriting information according to an embodiment of the present invention. If it is determined that the receiving mobile terminal 403 cannot reproduce the animation, the handwriting animation message is expressed as a still image such as in the JPEG format or the GIF to convey desired information.

Referring to FIG. 8, handwriting information is input in each frame and a frame having the largest amount of information is selected and transcoded into a still image such as in the JPEG format or the GIF. In this case, one or more points included in the transcoded still image include position information without including time information. Typically, the last frame contains the largest amount of information and this is also true in FIG. 8, such that the last frame is transcoded into a still image in order to contain the desired information.

As can be appreciated from the foregoing description, the handwriting animation message is transcoded into a format suitable for formats supported by the receiving mobile terminal, and then transmitted to the receiving mobile terminal, whereby reproduction of the handwriting animation message can be achieved even if the receiving mobile terminal does not support a format used by the transmitting terminal.

While the invention has been shown and described with reference to a certain embodiment thereof, it will be understood by those skilled in the art that various changes in form and details may be made therein without departing from the spirit and scope of the invention as defined by the appended claims and their equivalents.

What is claimed is:

1. A method for transmitting a handwriting animation message, comprising:
receiving the handwriting animation message including coordinate information and time information of one or more points forming handwriting information, which is input by a user of a transmitting mobile terminal;

transcoding a frame comprising a largest amount of handwriting information among one or more frames forming the handwriting animation message into a still image, if a receiving mobile terminal does not support reproduction of the handwriting animation message; and transmitting the still image to the receiving mobile terminal.

2. The method of claim 1, further comprising:

checking file format information supported by the receiving mobile terminal using profile information of the receiving mobile terminal;

transcoding the handwriting animation message into a format supported by the receiving mobile terminal; and transmitting the transcoded handwriting animation message to the receiving mobile terminal.

3. The method of claim 2, wherein if the receiving mobile terminal supports reproduction of the handwriting animation message, the handwriting animation message is transmitted to the receiving mobile terminal without transcoding the handwriting animation message.

4. The method of claim 2, wherein checking file format information comprises:

checking supportable formats, a resolution, a transmission limit amount, and conversion priorities of the receiving mobile terminal.

5. The method of claim 2, wherein transcoding the handwriting animation message comprises:

extracting supportable format information contained in the file format information of the receiving mobile terminal; and transcoding the handwriting animation message using the extracted supportable format information.

6. The method of claim 5, wherein if there is no file format information supported by the receiving mobile terminal, an error message is displayed indicating that reproduction of the handwriting animation message is not supported.

7. An apparatus for transmitting a handwriting animation message, comprising:

a mobile terminal profile database for storing profile information of a receiving mobile terminal and transmitting it upon being requested;

an animation transcoder for transcoding a frame comprising a largest amount of handwriting information among one or more frames forming the handwriting animation message into a still image, if the receiving mobile terminal does not support reproduction of the handwriting animation message, and transmitting the still image to the receiving mobile terminal; and a controller for, upon receiving the handwriting animation message from a transmitting mobile terminal, controlling the mobile terminal profile database to extract the profile information of the receiving mobile terminal and transmitting profile information of the transmitting mobile terminal to the animation transcoder.

8. The apparatus of claim 7, wherein the animation transcoder, upon receiving the handwriting animation message comprising coordinate information and time information of one or more points forming the handwriting information which is input by a user of the transmitting mobile terminal, transcodes the handwriting animation message into a format supported by the receiving mobile terminal.

9. The apparatus of claim 8, wherein the controller transmits the handwriting animation message to the receiving mobile terminal without transcoding the handwriting animation message, if the receiving mobile terminal supports reproduction of the handwriting animation message.

10. The apparatus of claim 8, wherein the animation transcoder checks supportable formats, a resolution, a transmission limit amount, and conversion priorities of the receiving mobile terminal, and transcodes the handwriting animation message based on them.

11. The apparatus of claim 10, wherein the animation transcoder extracts supportable format information contained in file format information of the receiving mobile terminal and transcodes the handwriting animation message using the extracted supportable format information.

12. The apparatus of claim 11, wherein if there is no file format information supported by the receiving mobile terminal, an error message indicating reproduction of the handwriting animation message is not supported is displayed.

13. A system for transmitting a handwriting animation message, comprising:

a transmitting mobile terminal for transmitting the handwriting animation message comprising coordinate information and time information of one or more points forming handwriting information which is input by a user of a transmitting mobile terminal;

an animation messaging server for, upon receiving the handwriting animation message, transcoding the handwriting animation message into a format supported by a receiving mobile terminal using profile information of the receiving mobile terminal and transmitting the transcoded handwriting animation message; and the receiving mobile terminal for receiving the transcoded handwriting animation message, wherein if the receiving mobile terminal does not support reproduction of the handwriting animation message, a frame comprising a largest amount of handwriting information among one or more frames forming the handwriting animation message is transcoded into a still image and the still image is transmitted to the receiving mobile terminal.

14. The system of claim 13, further comprising one or more base stations for connecting the transmitting mobile terminal or the receiving mobile terminal with the animation messaging server.

* * * * *